March 4, 1969 J. PELKEY 3,430,761

COMBINATION GREETING CARD AND PHONOGRAPH RECORD

Filed Nov. 3, 1966

United States Patent Office 3,430,761
Patented Mar. 4, 1969

3,430,761
COMBINATION GREETING CARD AND PHONOGRAPH RECORD
Joseph Pelkey, P.O. Box 989, Pittsfield, Mass. 01201
Filed Nov. 3, 1966, Ser. No. 591,738
U.S. Cl. 206—62 1 Claim
Int. Cl. B65d 85/30; B42d 15/00

ABSTRACT OF THE DISCLOSURE

A combination phonograph record and greeting card in which the greeting card element thereof forms a suitable mailer for the phonograph record element thereof, and in which, after detachment of the record element therefrom, the card element may be suitably displayed by hanging means incorporated thereon, either by itself or in combination with the record, to become a permanent home decoration.

This invention relates generally to the field of mailable greeting cards, and more particularly to an improved form thereof having means thereon for retaining a nonfrangible phonograph record which may be played on a suitable instrument for delivering a verbal greeting.

It is among the principal objects of the present invention to provide a combination phonograph record and greeting card in which the greeting card element thereof forms a suitable mailer for the phonograph record element thereof, and which, after detachment of the record element therefrom, the card element may be suitably displayed by hanging means incorporated thereon, either by itself or in combination with the record, to become a permanent home decoration.

Another object of the invention lies in the provision of a combination phonograph record and greeting card of the class described, in which the cost of fabrication may be of reasonably low order, with consequent wide sale, distribution and use.

A further object of the invention lies in the provision of an improved combination phonograph record and greeting card which in fully assembled condition may be of relatively flattened configuration, to facilitate the mailing thereof, and of sufficiently light weight to permit the posting thereof as a conventional first class mailing package.

Yet another object of the invention lies in the provision of an improved combination record and greeting card in which the means for fixing the record upon the card may be completely removed without the necessity of tools, or specialized knowledge, and without damage to either the record or the card.

A feature of the invention lies in the unusually attractive appearance of the combined embodiment.

Another object of the present invention lies in the provision of a combination phonograph record and greeting card wherein the record may be rotatably mounted on the card so that when the card is hung on the wall like a picture, or hung from some other support, the record forms an integral part of the composite article, and the design thereof, and the record can be spun to produce an entertaining effect.

These objects and features, as well as other incidental ends and advantages will more fully appear in the progress of this disclosure.

In the drawing, to which reference will be made in the specification, similar reference characters have been employed to designate corresponding parts throughout the several views.

Figures 1, 2, 3, 4, 5:
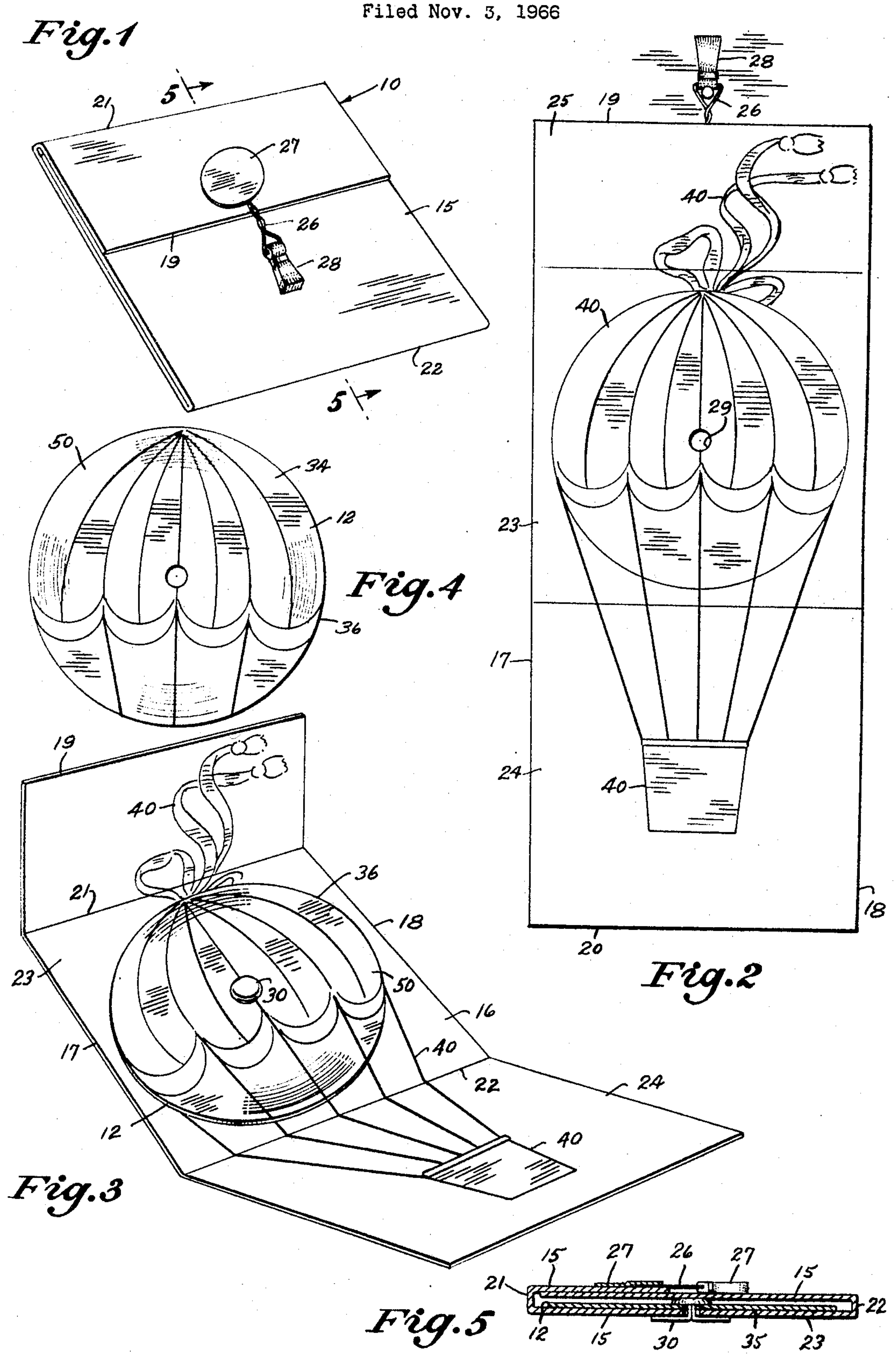
FIGURE 1 is a view in perspective of an embodiment of the invention, showing the same in a fully closed condition.
FIGURE 2 is a view in elevation showing the greeting card element which comprises a part of the embodiment in fully opened condition, and suspended from a vertically oriented support.
FIGURE 3 is a view in perspective corresponding to that seen in FIGURE 1, but showing the device in a partially opened condition, and prior to removal of the record element therefrom.
FIGURE 4 is a view in elevation of the record element in detached condition.
FIGURE 5 is a longitudinal sectional view, as seen from the plane 5—5 in FIGURE 1.

In accordance with the invention, the device, generally indicated by reference character 10, comprises broadly: a greeting card element 11 and a phonograph record element 12.

The greeting card element 11 is preferably formed from relatively heavy paper stock, so as to render the same suitable for mailing within an envelope (not shown), and is bounded by an outer surface 15 (see FIGURE 5), an inner surface 16, side edges 17 and 18, end edges 19 and 20, and fold edges 21 and 22.

The fold edges 21 and 22 define a main panel 23, a first relatively large flap 24, and a second smaller flap 25. As best seen in FIGURES 1 and 2, the outer surface of the small flap 25 is preferably provided with hanging loop means 26, held in place by an adhesive sticker 27 or the like. The loop means 26 may be provided with an ornamental tassel 28. A central opening penetrates the plane of the element 11, and is situated in the center of the main panel 23. The opening 29 is selectively engaged by a spreadable brad or fastener 30.

The phonograph record element 12, for reasons of economy, is preferably formed of fibrous material having a suitable synthetic resinous coating on first and second surfaces 34 and 35 thereof. It is bounded by an outer peripheral edge 36, and a centrally disposed opening 37, which is of a diameter to enable the same to be played on standard phonographs.

During assembly, the phonograph record element 12, which may be recorded on either or both sides is secured by the brad 30 in the manner shown in FIGURES 3 and 5, following which the flaps 24 and 25 are folded to form an enclosure about the record element 12. The device may be then placed in a rectangularly shaped envelope for mailing to a recipient.

Upon receipt, the record may be removed from the card, which may then be hung upon a wall or other support, as shown in FIGURE 2, and the record independently played. The surface 16 is provided with surface embellishment in the form of a design 40 and the record 12 is provided with surface embellishment in the form of a design 50 which is correlated to the design 40, so that a unitary design is provided, and the device 10 can be hung with or without the record 12 in place.

I wish it to be understood that I do not wish to be limited to the exact details shown and described for obvious modifications will occur to a person skilled in the art to which the present invention pertains.

I claim:

1. In a combination greeting card element and planar phonograph record element, the improvement comprising: said greeting card being of planar material, and including a first rectangular panel, a second rectangular panel interconnected to said first panel at a fold line, and a third rectangular panel interconnected to said first panel by a second fold line opposite said first mentioned fold line; said first panel having a central opening therein, said third panel having means thereon for supporting said card element upon a wall; said record element forming a part of the composite article and having a centrally disposed opening therein; and a detachable spreadable fastener extending through said openings in said card element and said record element for maintaining the record element on said card in a rotatable condition; said record element being smaller than the panel on which it is mounted, the fastener maintaining the peripheral edge of the record element spaced from the edges of the card element, whereby the record element is fully protected by the folded card element.

References Cited

UNITED STATES PATENTS

| | | | |
|---|---|---|---|
| 1,121,239 | 12/1914 | Fuller. | |
| 1,541,002 | 6/1925 | Shramek. | |
| 2,122,048 | 6/1938 | Shapiro | 206—57 |

FOREIGN PATENTS

| | | |
|---|---|---|
| 404,515 | 1/1934 | Great Britain. |

JOSEPH R. LECLAIR, *Primary Examiner.*

W. T. DIXSON, *Assistant Examiner.*

U.S. Cl. X.R.

229—92.8